United States Patent

[11] 3,593,306

[72] Inventor Wing N. Toy
Glen Ellyn, Ill.

[21] Appl. No. 844,914

[22] Filed July 25, 1969

[45] Patented July 13, 1971

[73] Assignee Bell Telephone Laboratories, Incorporated
Murray Hill, Berkeley Heights, N.J.

[54] APPARATUS FOR REDUCING MEMORY FETCHES IN PROGRAM LOOPS

8 Claims, 2 Drawing Figs.

[52] U.S. Cl. 340/172.5

[51] Int. Cl. G06f 9/12

[50] Field of Search 340/172.5; 235/157

[56] References Cited

UNITED STATES PATENTS

| | | | |
|---|---|---|---|
| 3,251,041 | 5/1966 | Yaohan Chu | 340/172.5 |
| 3,283,307 | 11/1966 | Vigliante | 340/172.5 |
| 3,290,656 | 12/1966 | Lindquist | 340/172.5 |
| 3,337,851 | 8/1967 | Dahm | 340/172.5 |
| 3,348,211 | 10/1967 | Ghiron | 340/172.5 |
| 3,466,613 | 9/1969 | Schlaeppi | 340/172.5 |

*Primary Examiner*—Paul J. Henon
*Assistant Examiner*—Sydney Chirlin
*Attorneys*—R. J. Guenther and William L. Keefauver

ABSTRACT: The first instruction in a program loop and the address of the second instruction in the loop are temporarily stored in a small, fast, secondary memory. These temporarily stored values are then used each time the last instruction in the loop transfers to the first instruction, thereby saving $n-1$ primary memory fetches in a loop executed $n$ times.

INVENTOR
W. N. TOY
BY
ATTORNEY

APPARATUS FOR REDUCING MEMORY FETCHES IN PROGRAM LOOPS

BACKGROUND OF THE INVENTION

1. Field of the Invention

This invention relates to the logic design of digital computers and specifically to apparatus for decreasing the execution time of program loops.

2. Description of the Prior Art

Much of the power of a digital computer resides in its ability to execute conditional transfer instructions. These instructions allow a particular sequence of instructions, commonly termed a loop, to be repeated until a prescribed condition is met, at which time control is transferred to the next sequential instruction outside the loop.

Unless special provisions are made to handle instruction loops, each instruction in the loop must be fetched form memory each time the loop is executed. Since the execution time of most instructions is small compared to the time required to fetch them and their operands from memory, the execution time of a program is directly related to the number of fetches needed for its execution. Conditional transfer instructions thus provide computational power at the cost of increased execution time.

Prior art solutions to this problem, as illustrated by U.S. Pat. No. 3,337,851, granted to D. M. Dahm on Aug. 22, 1967, provide a means for reducing memory access time for loops in which a group of the most recently executed instructions are stored in a high-speed secondary memory. Any loops contained within the secondary memory can be executed without further interaction with the primary memory.

This solution works well if the secondary memory is large enough to store all the instructions in a loop. However, since the secondary memory has a finite capacity which is considerably less than the capacity of the primary memory, each transfer instruction must be checked to determine whether its transferee instruction is currently stored in the secondary memory. If it is not, the primary memory must be accessed. The testing of each transfer instruction increases the execution time of all transfer instructions and requires additional logic circuitry. This testing can be eliminated and a decrease in the execution time of every loop may be obtained when the computer contains apparatus as shown in U.S. Pat. No. 3,283,307 granted to F. S. Vigliante on Nov. 1, 1966, that allows it to recognize transferred instructions.

It is an object of this invention to decrease the time required to execute program loops.

It is a specific object of this invention to decrease the number of primary memory fetches required during the execution of a program loop regardless of the size of the loop.

It is a more specific object of this invention to provide a simple means of achieving this decrease through a novel modification of the apparatus described in the Vigliante patent.

SUMMARY OF THE INVENTION

In accordance with these objects, the present invention uses suitably controlled last-in-first-out buffers to store the first instruction of each loop as well as the address of the next sequential instruction in the loop. A transfer of control to the first instruction of a loop cause this instruction to be fetched form the buffer rather than from the primary memory. The stored address is simultaneously loaded into the program store address register to allow program execution to continue. The last-in-first-out operation of the buffer provides the capability of handling nested loops.

DETAILED DESCRIPTION

As disclosed in the aforementioned Vigliante patent, each transferee instruction contains a suffix portion. When a transfer instruction is executed, the suffix portion of the next instruction to enter the instruction register is checked to insure that it is set. If it is set, this indicates that control was properly transferred to a transferee instruction. If it is not set, an error signal is generated indicating that the transfer was misinterpreted, causing transfer to an improper instruction.

This invention does not use all of the apparatus disclosed by the Viglainte patent and hence the following description will be confined to the specific improvement and to those parts of the Vigliante apparatus required for an understanding of the present invention.

A transferee instruction is the first instruction in a loop. Irrespective of the size of the loop, the transferee instruction must be fetched each time the loop is executed. In a loop that is executed *n* times, this instruction will be fetched from memory *n*-1 times. These memory fetches can be eliminated simply by providing temporary storage for both the transferee instruction and the contents of the program store address register at the time the transferee instruction is executed. This reduction in memory fetches, dependent solely upon the number of loop executions, will occur for each and every loop. Since the amount of information being stored for each loop is the same regardless of the size of the loop, apparatus for determining the size of the loop is not needed.

Figure 1:
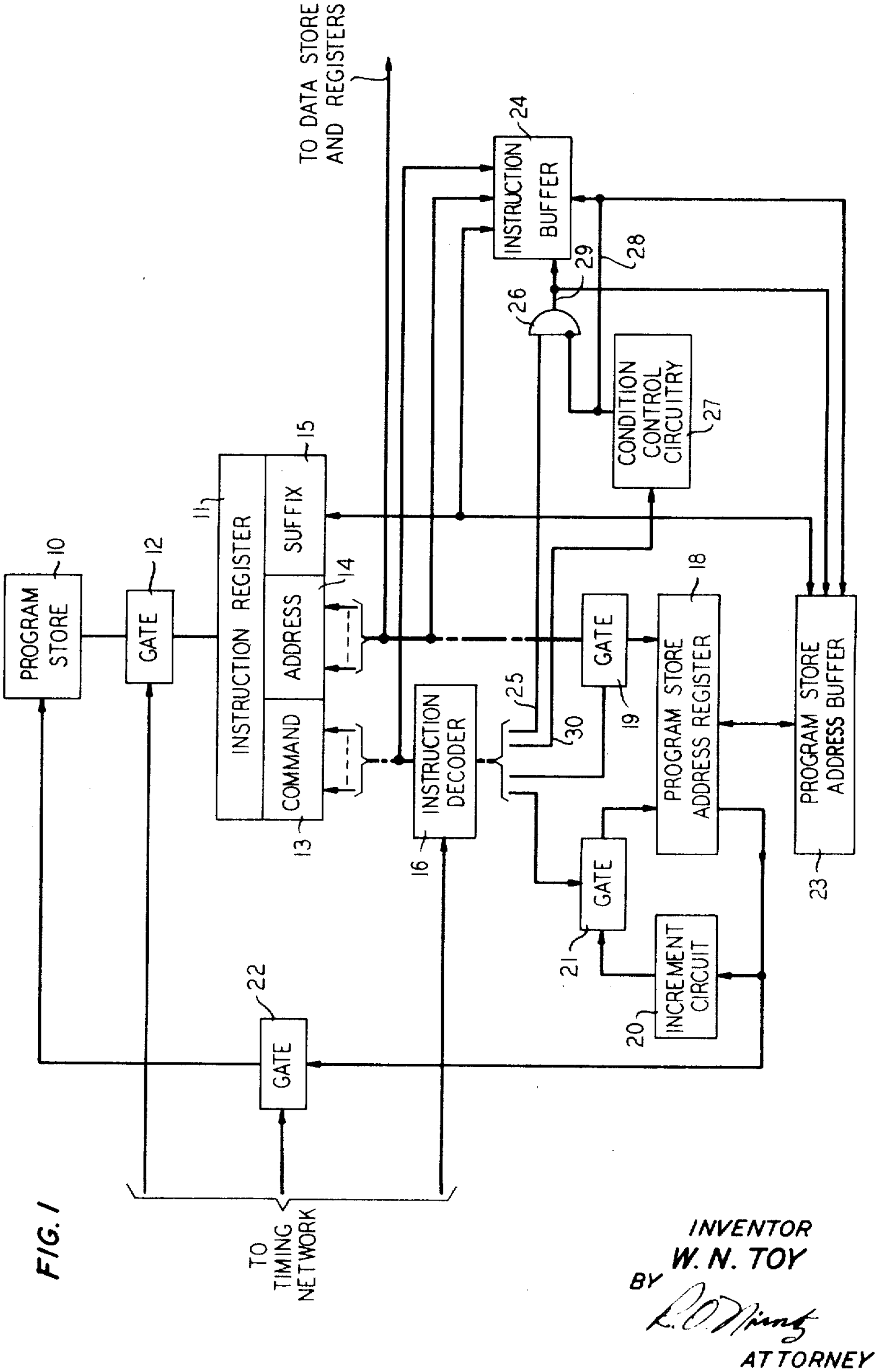
FIG. 1 shows a functional block diagram of the invention.

FIG. 1 is a block diagram of the portion of a computer's logic circuitry and the additional apparatus that must be used to practice the invention. Program instructions are stored in program store 10. They are periodically gated into instruction register 11 by gate 12. Gate 12, along with gate 22 and instruction decoder 16, are periodically enabled by a timing network (not shown) of conventional construction. Instruction register 11 is used in the well-known manner to buffer instructions received from program store 10 prior to their being decoded.

An instruction entering register 11 may have three portions: a coded command that enters the first section 13 of register 11; a coded address that enters the second section 14 of register 11; and a suffix that enters the third section 15 of register 11. The command is translated by the decoder 16; the address is dispatched to the data store and registers. The suffix desirably comprises an identification bit that is zero for all instructions except transferee instructions.

When the steps of a program follow in sequence, the address contained in program store address register 18 is augmented by one to obtain the address of the next instruction. This augmentation is performed by a standard increment circuit 20 and gate 21. The increment address is then gated from register 18 to the program store 10 by a signal applied to gate 22 by the timing network.

When instruction register 11 contains a nonconditional transfer instruction, the address portion of the instruction specifies the location of the next instruction to be executed. Decoder 16 will enable gate 19 rather than gate 21, resulting in a transfer of the address portion of the instruction into register 18, replacing that register's former contents and causing the next instruction to be fetched from this new address.

When instruction register 11 contains an instruction to which a conditional transfer instruction may transfer, that is, a transferee instruction, its identification bit is transmitted from the third section 15 of register 11 to program store address buffer 23 and instruction buffer 24. This causes buffer 23 to store the contents of register 18 and buffer 24 to store portions 13 and 14 of register 11. The detailed operation of these buffers will be explained below.

When instruction register 11 contains a conditional transfer instruction, decoder 16 supplies a signal on line 25 to gate 26. If a loop is to be repeated, condition control circuitry 27 will not generate an output signal and gate 26 will transmit the signal on line 25 to buffers 23 and 24 causing them to shift the most recently stored value back into registers 18 and 11, respectively, thus repeating the loop. Condition control circuitry 27 generates an output inhibiting gate 26 only when the loop has been executed the proper number of times. Inhibiting gate 26 then prevents buffers 23 and 24 from affecting registers 18 and 11 and allows the next sequential instruction outside the loop to be fetched and executed.

Condition control circuitry 27 contains counters and comparators that utilize the information contained in the conditional transfer instruction to determine the number of times the loop is to be executed. This information is transmitted to condition control circuitry 27 by output 30 of instruction decoder 16. For example, the transfer instruction may direct a counter to be decremented each time the instruction is executed and compared to a constant value such as zero. When a match occurs, circuitry 27 generates an output signal. The function and construction of the condition control circuitry are well known in the art and will not be explained in detail herein.

Figure 2:
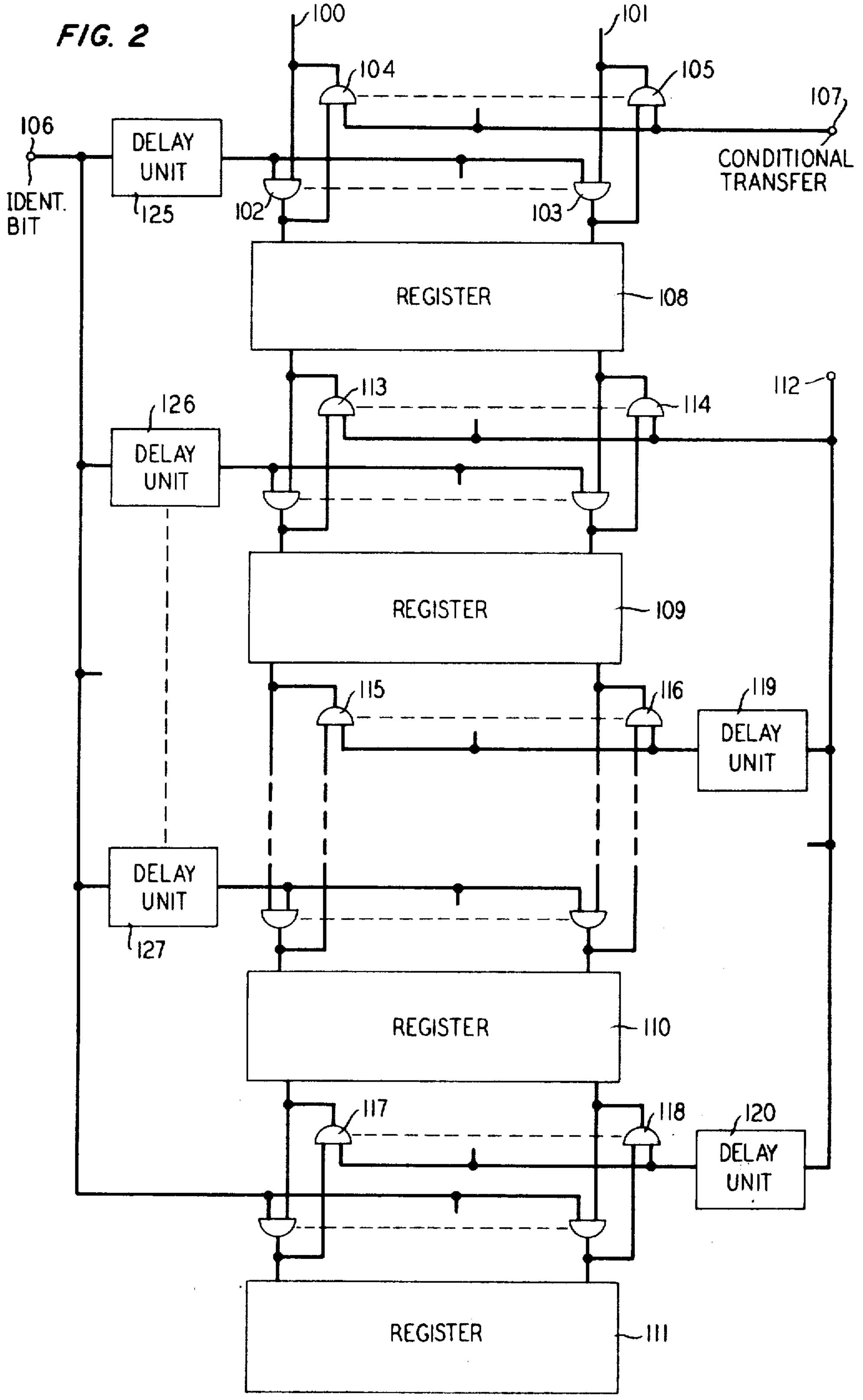
FIG. 2 is a more detailed view of the address and instruction buffers shown in FIG. 1.

Program store address buffer 23 and instruction buffer 24 are identical in construction an operation. These buffers, commonly termed last-in-first-out buffers, are shown in FIG. 2 to comprise a plurality of registers concatenated by AND gates. The proper application of enabling signals causes the contents of a particular register in the buffer to transfer its contents to either the register immediately above it or the register immediately below it.

The buffer of FIG. 2 includes a plurality of registers 108—111 to allow nesting of loops, that is, loops within loops. However, only completely nested loops are allowed. For example, in the case of three nested loops, the smallest loop must be completely contained within the middle-sized loop which must in turn be completely contained within the largest loop.

As a sequence of code containing a number of nested loops is executed, the transferee instruction of each loop will be successively encountered and stored, along with the address of the next sequential instruction. Next, each transfer instruction will be successively encountered and its corresponding transferee instruction, along with the address of the next sequential instruction, will be transferred from their respective buffers to instruction register 11 and program store address register 18.

The operation of the buffer may be more fully understood by a detailed consideration of FIG. 2. Lines 100—101 allow information to be transferred into and out of the buffer through gates 102—103 and 104—105, respectively. As previously mentioned, this information transfer is under the control of both the identification bit and the signals appearing on line 25 of FIG. 1 indicative of a conditional transfer instruction. Terminal 106 in FIG. 2 corresponds in FIG. 1 to the connection of buffers 23 and 24 to the third portion 15 of register 11. Terminal 107 in FIG. 2 corresponds in FIG. 1 to the input to buffers 23 and 24 of the output 29 of gate 26. Terminal 112 in FIG. 2 corresponds in FIG. 1 with the output 28 of condition control circuit 27.

The presence of a signal at terminal 106 causes a word to be shifted into the buffer. Delay units 125, 126, and 127 allow each register to shift its contents down to the next register before the new word is shifted into register 108. Each delay unit must be set so as to allow for the settling time of each register below it. Thus the delay of unit 127 must be set equal to the settling time of register 111 and the delay of unit 127 must be set equal to the total settling time of registers 109 to 111.

The registers contained in instruction buffer 24 (FIG. 1) store only the first portion 13 and the second portion 14 of instruction register 11. This is because only the first occurrence of a loop's transferee instruction should be stored in the buffer. Since the presence of an identification bit in the suffix portion 15 of instruction register 11 will cause the buffer to shift and store a new word, each pass through a particular loop would otherwise cause that loop's transferee instruction to be stored again.

The buffer is read out by a signal appearing at terminal 107 enabling gates 104—105 to transfer the contents of register 108 out on lines 100—101. It is to be noted that this readout does not destroy the contents of register 108. Thus register 108 is read out each time the loop is executed.

On the last pass through the loop, condition control circuit 27 (FIG. 1) generates a signal, as previously discussed, that will inhibit gate 26, and hence a signal will not be transmitted to terminal 107 (FIG. 2). The signal generated by condition control circuitry 27 will also be transmitted on line 28 to terminal 112. This signal will successively enable gates 113—114, 115—116, and 117—118, causing each stored word to be shifted up to the next highest register. This action destroys the former contents of register 108 which is permissible since the corresponding loop has been completely executed. Delay units 119—120 must be set to account for the settling time of all the registers above them in the same manner as delay units 125—127 must be set to account for the settling time of all registers below them.

What I claim is:

1. A programmed digital data processor including a main memory and two auxiliary memories comprising:
   means for extracting from each main memory a transferee instruction to which a transfer is allowed by other, transfer, instructions;
   means for storing a selected portion of said transferee instruction in one of said two auxiliary memories;
   means for incrementing and then storing the incremented main memory address of said transferee instruction in the other of said two auxiliary memories;
   means for extracting from said main memory a transfer instruction whose designation is said transferee instruction;
   and means responsive to said transfer instruction for retrieving both said stored selected portion of said transferee instruction and said incremented stored address from said auxiliary memories.

2. Apparatus as in claim 1 wherein said auxiliary memories comprise last-in-first-out buffers.

3. Apparatus for decreasing the execution time of program loops in a digital computer comprising:
   means for temporarily storing both the first, or transferee, instruction in each of said program loops and the address of the next sequential instruction following each said transferee instruction;
   and means responsive to the last, or conditional transfer, instruction in each of said program loops for fetching both said transferee instruction and said address from said temporary storage means.

4. In combination with a digital computer of the type wherein the first, or transferee, instruction in each program loop contains a suffix portion, the improvement which comprises:
   means for using said suffix portion to detect the first execution of said transferee instruction in each particular program loop;
   means for temporarily storing each of said transferee instructions at the time of said first execution;
   means for temporarily storing the contents of the program address register contemporaneously with said storing of each of said transferee instructions;
   means for detecting the end-of-loop, or conditional transfer, instruction corresponding to each of said transferee instructions;
   and means responsive to each of said conditional transfer instructions for fetching both the corresponding transferee instruction and program address register contents from said temporary storage means.

5. The method of reducing the execution time in a digital computer of a sequence of program instructions that are repetitively executed until a terminating signal has been generated, comprising the steps of:
   1. detecting the first execution of the first, or transferee, instruction in said repetitively executed sequence of instructions;

2. storing said detected transferee instruction and the address of the next sequential instruction following said detected transferee instruction in a high-speed memory;
3. executing program instructions until a conditional transfer instruction has been executed;
4. determining whether said execution of said conditional transfer instruction has resulted in the generation of said terminating signal;
5. fetching said transferee instruction and said next sequential address from said high-speed memory and returning to step (3) if said terminating signal has not been generated;
6. and executing the next sequential instruction following said conditional transfer instruction if said terminating signal has been generated.

6. The method of reducing the execution time in a digital computer of nested sequences of program instructions, each sequence being repetitively executed until a terminating signal has been generated, comprising the steps of:
1. detecting the first execution of the first, or transferee, instruction in each of said nested sequences of repetitively executed program instructions;
2. storing each of said detected transferee instructions and the addresses of the next sequential instruction following each of said detected transferee instructions in a high-speed memory;
3. executing program instructions until a conditional transfer instruction has been executed;
4. determining whether said execution of said conditional transfer instruction has resulted in the generation of said terminating signal;
5. fetching the most recently stored transferee instruction and address from said high-speed memory and returning to step (3) if said terminating signal has not been generated;
6. executing the next sequential instruction following said conditional transfer instruction if said terminating signal has been generated;
7. and repeating steps (3) through (6) until at least one terminating signal has been generated by each of said repetitively executed sequences.

7. The method of increasing the speed of execution of program loops in a digital computer comprising the steps of:
1. storing the first instruction of each said loop in a local, fast-access storage medium;
2. storing the address of the second instruction of each said loop in a local, fast-access storage medium;
3. utilizing said first instruction and said address of said second instruction from said local fast-access storage medium each time said loop is traversed.

8. The method according to claim 7 further including the step of:

entering said first instruction and said address of said second instruction into pushdown storage media for executing nested program loops.